TELEVISION SCANNING SYSTEM

Filed May 18, 1954

7 Sheets-Sheet 1

INVENTOR
P. M. G. TOULON

BY Moore and Hall
ATTORNEYS

Sept. 29, 1959 P. M. G. TOULON 2,906,812

TELEVISION SCANNING SYSTEM

Filed May 18, 1954 7 Sheets-Sheet 2

INVENTOR

P.M.G. TOULON

BY

Moore & Hall

ATTORNEYS

Sept. 29, 1959 P. M. G. TOULON 2,906,812

TELEVISION SCANNING SYSTEM

Filed May 18, 1954 7 Sheets-Sheet 3

INVENTOR

P. M. G. TOULON

BY Moore and Hall

ATTORNEYS

INVENTOR
P. M. G. TOULON
BY Moore and Hall
ATTORNEYS

TELEVISION SCANNING SYSTEM

Filed May 18, 1954 7 Sheets-Sheet 5

INVENTOR
P. M. G. TOULON

BY Moore and Hall.
ATTORNEYS

Sept. 29, 1959 P. M. G. TOULON 2,906,812

TELEVISION SCANNING SYSTEM

Filed May 18, 1954 7 Sheets-Sheet 6

INVENTOR

P. M. G. TOULON

BY Moore and Hall

ATTORNEYS

INVENTOR
P. M. G. TOULON
BY Moore and Hall.
ATTORNEYS

United States Patent Office 2,906,812
Patented Sept. 29, 1959

2,906,812

TELEVISION SCANNING SYSTEM

Pierre M. G. Toulon, New York, N.Y.

Application May 18, 1954, Serial No. 430,561

5 Claims. (Cl. 178—5.2)

This application is a continuation-in-part of my prior copending application Serial No. 163,285, filed May 20, 1950, entitled "Color Television," now abandoned.

The invention relates to a system of television and is particularly useful as a compatible color television system. The new system is compatible with "black and white" reception on the ordinary low cost narrow band receivers, and it is also compatible for "color" reception with the wider bands available in higher price receivers. One advantage of the new television system is that it is without color flicker. Only one usual classical electron gun tube is required. Moving parts may be avoided if I use colored filters which changes its colors at the comparatively slow field rate.

The three color television systems now being extensively considered transmit for the several points of the image, modulated voltage impulses corresponding to the density of light of three monochromatic pictures (red, green, blue). For this purpose three general techniques are used:

A first technique (field sequential) consists of scanning all the points of the first monochromatic picture such as yellow, then all the points of the same image second monochromatic picture such as red, and finally all the points of the third monochromatic picture such as blue; and to begin again with the following field or image.

A second technique, that of line sequential, consists of scanning one line with a first color such as red and then, to scan the same or a closely neighboring line with the second color such as green (or yellow) and finally to scan the same or a neighboring line with the third color such as blue. After that the cycle begins again with the following lines.

A third technique, that of dot sequential consists in transmitting one immediately after the other, the three monochromatic densities for each point. Alternatively they may be sent simultaneously through three individual channels, namely through three separated frequency bands.

The advantage of the first technique, that of field sequential, lies in the slow rate of color change (1/60 second). It requires only one classic cathode ray tube combined with a rotating colored filter (or a static color variable filter made for example by an electrostatic birefringent matter such as ammonium phosphate or the like between polarizers). When the standard 60 fields per second line interlace scanning is used for compatibility, a heavy colored flicker appears at cadency of 20 per second. The frequency of the field is therefore increased to 144 or 180 at the expense of compatibility which becomes poor. With the second technique, that of line sequential, the color flicker effect is reduced, but the rate of color change of filters becomes very high $60\times262=15{,}720$. Consequently, the mechanical systems for changing the color are not practical and the electrostatic optical process must be used.

The two above described systems have very substantial drawbacks. For the same accuracy of picture in course of time, the time allowed for scanning each monochromatic line is only 1/3 of the usual "white and black."

With the third process, it is easy to allot the same period of time for each dot and an accurate definition and compatibility with the low cost small band receiver; for the color receiver the colored flicker effect is reduced to a minimum especially with the dot interlaced scanning, but the high sequence of color change about $3\times10^6$ r./s. is difficult to operate with the same negative tube. Therefore three cathode ray tubes of which the images are optically superimposed with dichroic mirrors are used and the coincidence of the three pictures is very difficult to obtain. If one uses a special colored band layer tube it is also very difficult to maintain the time and local coincidence between the beam and the respective color filters.

According to the invention the new process has the advantage of the third process that is lack of color flicker with fine definition for the white and black receiver and retains in addition the advantages of the field sequential system without its drawbacks. Color reception is obtained by the means of a standard cathode ray tube and the change of color is made at a slow pace.

According to the invention the respective densities of the three elementary monochrome are transmitted simultaneously as explained in the third process but instead of referring to the same point of the picture, the corresponding values refer to different points of the field, that are place shifted one from the other.

In the case of 525 line picture, one embodiment of the invention consists of using a three band frequency 6 megacycle wide channel and to modulate the 0 to 2 megacycle part with the first monochrome yellow corresponding to the first line and to substantially simultaneously modulate the second channel for instance from 2 to 4 megacycle with the second monochrome red corresponding to the $525/3=175$th line and to modulate at substantially the very same time the third channel for instance from 4 to 6 megacycles with the third monochrome corresponding to the $2\times525/3=350\text{th}+1$ line or 351st.

According to the invention the first channel yellow channel 0 to 2 megacycle is adapted to act on the ordinary low price receiver and the red and blue channel are translated into the higher frequency bands.

For the purpose of easily separating the second channel, the red is preferably reversed so that the red low frequency is in the neighborhood of 4 megacycles and the red high frequency in the neighborhood of 2 megacycles.

According to the invention, the frequency of the heterodyne oscillations used to beat with the selected color portion of the video impulses is a sub-multiple of the carrier frequency of the radio waves so that no phase shift will appear between the mixer at the departure and the demodulation at the receiver station.

According to an embodiment of the invention, the mixer for purpose of transferring the frequency of the second or red channel passes a band from 2 to 4 megacycles so as to clearly separate the bands. A heterodyne oscillation at a sub-multiple of the carrier wave will produce this channel.

The two demodulators at the receiving station are also phase shifted by 90° so that the interaction of the two channels 2 to 4 megacycles and 4 to 6 megacycles is reduced to a minimum.

According to the invention at the receiving station the three channels are intermixed with each other and are used successively to modulate the grid of the electron ray tube.

According to the invention three auxiliary deviations of the beam are superimposed in synchronization with the successive value of the dots constituting monochromes.

According to the invention the three different parts of the screen to which the electron beam is successively directed, namely line 1, line 175 and line 351, are covered at that precise time with monochromatic filters of which the color is made to be variable in course of time.

According to the invention, such variation in color of the filter is controlled in the course of time so that the repeat sequence of the scanning of a field corresponds to the apparent displacement of the colored bands of the filter.

Consequently almost simultaneously on the screen, the three elementary pictures appear in yellow, red, and blue at three different locations within the field, and these locations change color at one-third the field sequential frequency.

The apparatus circuit and its operations can be better understood in the following description with the corresponding drawing:

Figure 1 explains in function of time the deviation on the beam and the corresponding intensity of light.

The invention is based on the general observation that the most important difficulty encountered in the television and especially in color television is the limitation of the high frequency band transmissible from the radio station. At the sending and receiving station the cathode ray tube can be easily deflected at a speed very much higher than the normal requirements. The modulating devices to modify the voltage applied to the tube can also be operated accurately without difficulties at much higher rates than are now required.

During the short time separating the emission of two successive points of the picture, it is easy to use the beam for more than one purpose with a local and accurate deflection. This observation of cathode ray characteristics is the very basis for the present system.

Figure 1:
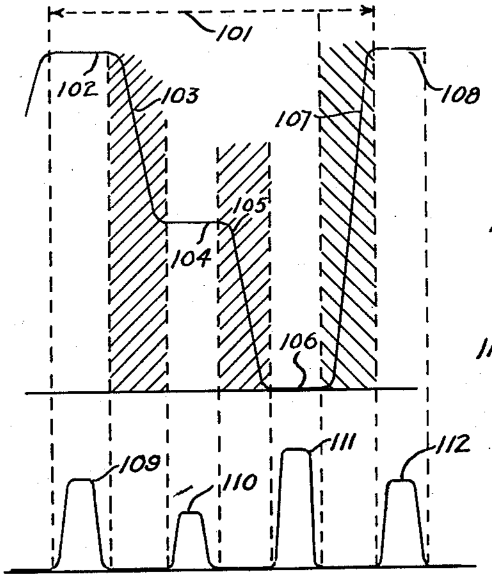

In Figure 1, the diagram shows in function of time the vertical displacement of the beam realized with the process according to the invention.

During the short time 101 namely one-third or one-fifth of the total time corresponding to two successive points of picture, means are provided for successively maintaining the spot at a first location 102 during a portion of the available time and (2) the displacement from the first place to a second location 104 elsewhere on the screen, the transient period hatched 103 being limited at a time for example shorter than the first step 102 and for (3) maintaining the spot at a second location 104 during another portion of the available time, and (4) to displace again from this second location to a third 106, the transient period hatched 104 being also very short and for (5) retaining the spot at this third location 106 during an appreciable time, and for (6) finally displacing the spot to the new value 108 of the following point of the picture, with a short transient hatched time 107.

According to the invention the distances between the steps are constant and very accurate namely with constant additive values applied on the deviation plates. During each step of the beam 102, 104, 106 the control grid receives an appropriate modulated value corresponding to one point of the three monochrome namely yellow 109, red 110, and blue 111. After that a new cycle begins again with the following point yellow 112 and so on.

According to the invention during the passage from one step to the following, the modulation grid of the cathodic tube is preferably biased or lowered so that the beam does not start any tracing action on intermediate portions of the screen. The spot lights only the accurate location and its intensity corresponds to the amount of each monochromatic chosen value.

This new dispersion process gives the possibility of reproducing practically simultaneously the three monochromatic pictures, with only one classical cathode ray tube.

Figure 2:
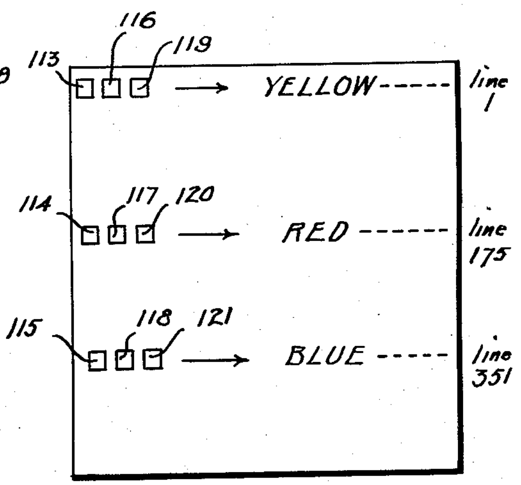
Figure 2 shows the position on the screen of the impact of the electron beam.

Figure 2 shows a front view of the tube. The scanning presently uses the classical 525 horizontal line. According to a particular application of the invention, lines 1, 175, 351 are scanned in immediate succession and hence practically simultaneously, the first corresponds to the yellow color, the second in red, the third in blue. In addition to the normal line frequency horizontal relaxator, the field frequency vertical relaxator means are provided in accordance to the invention for a very rapid vertical displacement of the spot in three steps.

Consequently, the order of scanning is as indicated in the drawing. After the first point 113 the first line (yellow) is scanned the first point of the 175th line (114) corresponding to the red color and then the first point of the 351st line 115 corresponding to the blue. Now a new cycle begins again with the second point 116 of the first line yellow and the second point 117 of the 175th line (red) and the second point 118 of the 35th line (blue).

The third cycle begins again with the third point 119 yellow, the third point 120 red, the third point 121 blue and so on . . . . After the scanning of all points of the first line, the third line in the case of an interlaced scanning is scanned and according to the principle explained above, the third is scanned in yellow, the 177th in red and 353rd in blue line are scanned in a manner substantially simultaneous. The same process is used for all successive lines. When the yellow scanning arrives from the first line to line 175, means are provided to modify the direction and amplitude of the recurring high steps, so as to make a continuity in action in the scanning. Supplementary switching means may be used to modify the order of the three steps in deflection voltages but are not detailed in the figures for easier intelligence.

Figure 3:
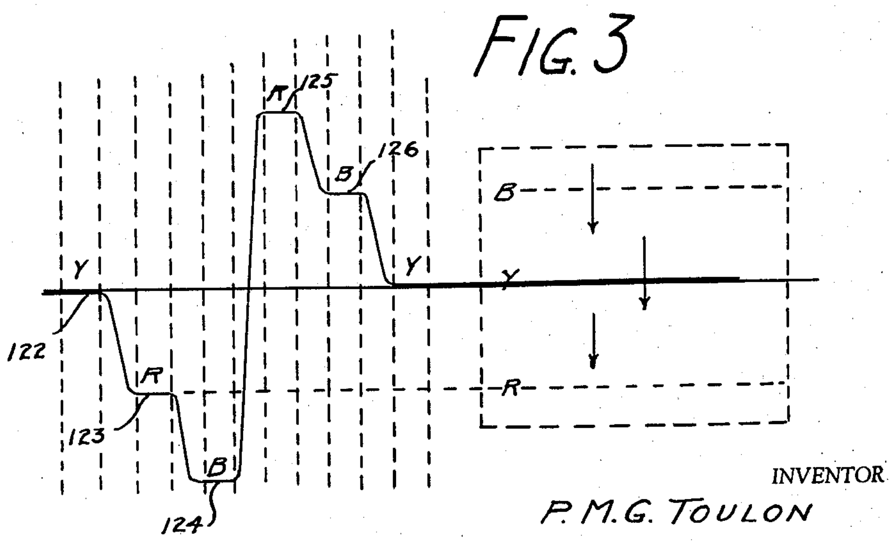
Figure 3 is a variant of Fig. 1 for the purpose of simplifying the distribution of impact points.

According to an improvement and for the sake of economy of construction this supplementary means can be avoided as is explained in Fig. 3. Instead of adding only two negative steps, one provides also two positive steps to a total of five steps between each successive point of the picture. The order of the five high steps are, for example: 122 is line N, 123 is line $N+174$, 124 is line $N+350$, 125 is line $N-350$, 126 is line $N-174$. In each case only one of the two red values (123 or 125) and only one of the two blue values 124 or 126 are used because only one is falling within the frame of the screen.

Figure 3A:
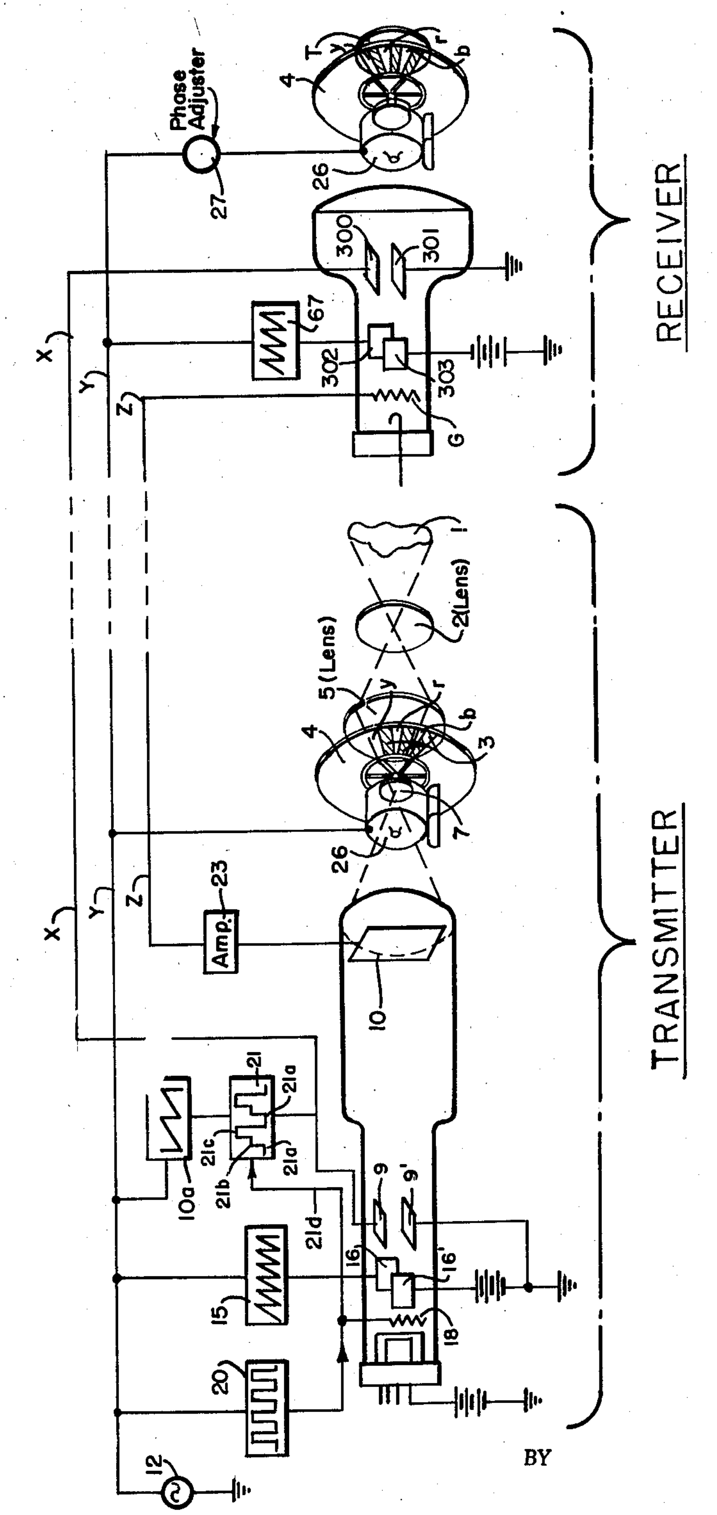
Figure 3A is a block diagram of a simplified form of the invention.

Figure 3A is a block diagram of a basic or elementary form of the invention in which the transmitter and receiver are connected together by wires instead of having the information radiated through the air. The object to be televised 1 is projected by a first lens 2 and a second lens 5 onto the scanning wheel 4 and thence to a pickup plate 10 of the television transmitting tube. Three color bands Y, R, and B are spaced by suitable opaque bands 3. It is understood that there are continuous series of color bands Y, R, and B repeating each other in that sequence all around the disc 4, each color band being spaced from the next one by an opaque area. The horizontal deflection generator 15 is driven from the 60-cycle alternating current source 12 in the usual way and operates upon plates 16 and 16' to deflect the beam horizontally. The vertical sawtooth generator 10*a* is also identical with those normally used in all television sets except for the fact that its amplitude is only one-third that customarily employed. In other words, it would normally move the beam only one-third of the vertical distance of the screen. The amplifier 23 is also of standard construction. Hence the only components which differ from the prior art are the combination of disc 4, the wave generator 21 and the wave generator 20. Wave generator 20 may be omitted if desired within the broadest aspects of the invention, as can grid 18, and consequently it is merely necessary to understand the cooperation between wave generators 10*a*, 21, and disc 4 in order to understand the concept of the invention. The repetition rate of the pulses from wave generator 21 are very high compared to the repetition rate of the horizontal sweep generator 15 and the vertical sweep generator 10*a*. In fact the wave generator 21 will complete one cycle for every three dots of color information to be transmitted. Assume that the sweep generator 10*a* is producing maximum potential and is therefore tending to cause the plates 9, 9' to sweep line 1 of Figure 2, that is the top horizontal line of the picture, the wave generator 21 will operate as follows: when the wave generator 21 is putting out zero output 21*a*, the beam will remain on the top line of the picture (line 1 of Figure 2). When, however, the wave generator produces potential 21*b*, which is sufficient to deflect the beam by one-third the vertical height of the picture, the potential of wave generator 21 will be subtracted from that of wave generator 10*a* and the beam will be shifted to point 114 of Figure 2, which is line 175. When the wave generator 21 shifts to its most negative value 21*c*, the beam will scan line 351 of Figure 2 and will therefore be at point 115. Since one cycle of wave generator 21 occurs in a very short time compared with the periodicity of the waves of generator 10*a*, when the wave generator 21 returns to zero value 21*a*, the beam will again return to the first horizontal line of the picture at point 116. As the sweep generator 10*a* moves the beam downward, the wave generator 21 will cause the points scanned to be at three different levels as follows: (1) at the same level as the normal scanning from generator 10*a* would otherwise effect; (2) one-third the vertical distance of the screen below the normal level of generator 10*a*, this occurring whenever the wave generator 21 is producing potential 21*b*; and (3) two-thirds the vertical distance of the screen below the normal level of wave generator 10*a*, this occurring when the wave generator 21 is producing the potential 21*c*. When the bottom line of the picture is being scanned, the wave generator 10*a* has moved the beam down one-third the distance of the screen and the peaks 21*c* from the wave generator 21 are lowering the beam to the bottom line of the picture.

As shown in Figure 3A, the object 1 will be directed by the lens 2 and the lens 5 through the three color bands Y, R, and B so that three distinct bands will appear on the plate 10. These bands will travel down the plate 10 at a speed depending on the rate of rotation of the disc 4. Likewise, the beam which impinges upon the disc 10 will be illuminating horizontal lines falling within the three color bands Y, R, and B, which are impressed on the plate 10. The beam will also move downwardly due to the wave generator 10*a* at the same speed that the disc 4 moves the color bands Y, R, and B down the face of the plate 10. The synchronous motor 26 and the wave generator 10*a* are synchronized and both driven by source 12, so that there is a synchronism between the vertical descent of the color bands Y, R, and B on disc 4 and the downward motion of the three horizontal lines scanned at any one time by the beam of the television tube. If desired, the wave generator 20 may be added to prevent any signal resulting during the periods of time 103 and 105 of Figure 1 during which the beam is traveling in a vertical direction between the three horizontal lines being scanned. The wave generator 20 is not absolutely necessary because most of the effect of the vertical motion of the beam during times 103 and 105 of Figure 1 is blocked out by the opaque members 3 of Figure 3A. However, if it is desired to produce a more perfect picture, the wave generator 20 may be used to produce a pulse and open grid 18 to the emission of a beam at the precise times that the wave generator 21 is producing potentials at the three plateaus or levels 21*a*, 21*b* and 21*c*. If the wave generator 20 is employed, it must somehow be synchronized with the wave generator 21. This could be done in any well known way such as by operating them from the same source of supply 12 through multipliers or otherwise. It may also be done as shown by having the output of wave generator 20, feed by means of wire 21*d* the input of the wave generator 21 to thus synchronize the pulses of generators 20 and 21. There are a large number of circuits suitable for both the wave generator 20 and the wave generator 21, and also there are well known ways of connecting two such generators together in order to produce synchronous operation, and therefore no further details are required at this time. The operation of the receiver is elementary since wire X carries the signal which is impressed on plate 9. This signal is a reproduction of the output of wave generator 10*a* from which has been subtracted the higher frequency waveform of wave generator 21. The wire Y carries the usual synchronizing potential. If both the transmitter and receiver are connected to the same power line, the wire Y may of course be omitted. The wire Z carries the output of amplifier 23 and is impressed on the grid G of the receiver. The wire X carries the information fed to the deflection plate 9 and impresses this signal on deflection plates 300 and 301 so that the beam at the receiver is deflected in the same vertical path as that of the transmitter. Likewise the horizontal generator 67 feeds the plates 302 and 303 so that the beam is deflected horizontally at the receiver in synchronism with horizontal deflections at the transmitter. The phase adjuster 27 may be employed to effect absolute synchronism between the motors 26 at the transmitter and the receiver. The receiving scanning disc 4 is the same as that at the transmitter and a suitable area of the same such as the area T is directly in front and obscures the entire face of the cathode ray tube 64. It is obvious, therefore, that the beam at the receiver will traverse the tube in the same way that the transmitter tube beam traversed its tube, and that the three color bands Y, R, and B at the receiver will illuminate the three horizontal lines in the same way that the images of those lines were impressed on the plate 10 at the transmitter. The output of these three horizontal lines appears in the three different colors the same as the three horizontal lines at the plate 10 represented the three different colors. Hence the receiver will reproduce in color the picture televised by the transmitter.

There will hereinafter be disclosed the details of a system wherein the signals are carried by radio waves from the transmitter to the receiver instead of carried by land lines. The basic principle is, however, the same and the disclosure following is merely illustrative of how the various signals at the transmitter can be combined and radiated with greatest facility and then reproduced at the receiver.

Figure 4:
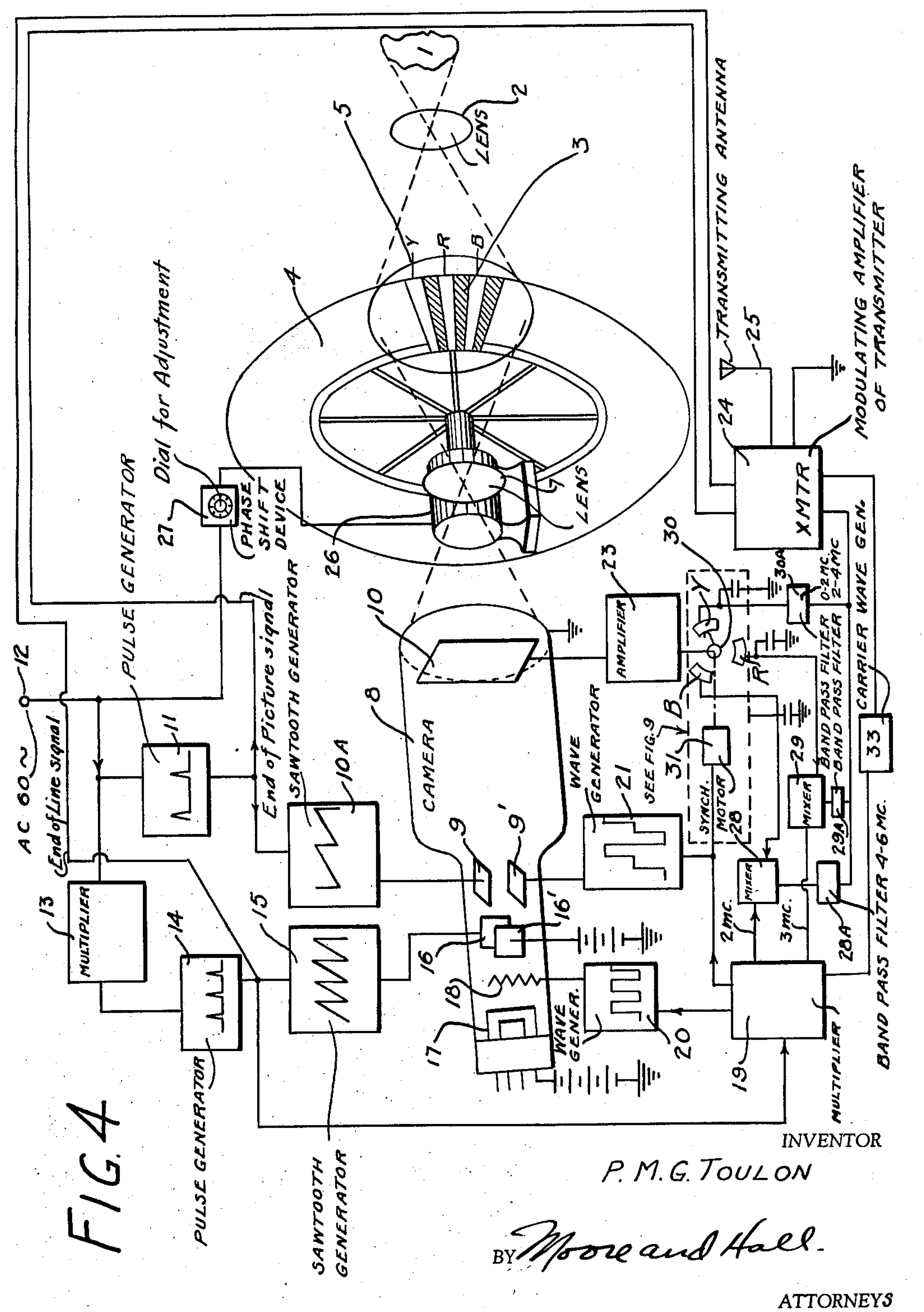
Figure 4 shows the circuit of the sending station.

Figure 4 shows a video emission device using the process according to the invention: The image of subject 1 being visioned by the electronic camera falls on the photoelectric surface 10 of image orthicon 8 after passing through a vertically moving color band filter 4. Preferably, a first image 3 of subject 1 is obtained on the filter 4 by means of lens 2, and the light rays are again concentrated on a second lens 7, through the means of a condenser lens 5.

The second image of the subject appears in the plane of the photoelectric surface 10 of electronic camera 8.

Disc 4 is preferably of large size and driven through multipolar synchronous motor 26 on the 60-cycle alternating current supply 12. The size of disk 4 is chosen so as to include a full number of complete images 5 each divided in three sectors corresponding to the three basic colors, namely yellow Y, red R, and blue B. Preferably the sectors are separated from each other by an opaque sector so that the different parts of screen 10 are lighted during a time exactly determined and the cathode beam gathers during the travel of the black sector electric charges photoelectrically obtained during the passage of the preceding colored sector. The sectors Y, R, B are disposed horizontally in the case above described in Figures 1 and 2, where lines 1, 176, 351 are scanned substantially at the same time. A phase shift device 27 is provided for the synchronous motor 26 to cause accurate synchronization of the scanning of disk motion with the beam scanning of electronic camera 8, so that the electron beam gathers the charges after the end of each monochromatic lighting of each portion of screen 10.

The operation of electronic camera 8 proceeds as in the standard systems. End of image signals are synchronized on current supply 12 and are obtained through generator 11. End of line signals are obtained through generator 14 synchronized through a multiplier 13.

The end of field signal operates a slow frequency sawtooth relaxator 10A for vertical deviation plate 9. The "end of line signal" 14 operates a higher frequency sawtooth relaxator 15 for the horizontal deviation plate 16.

The second plate 16' of the horizontal deviating plate is connected as usual to an appropriate continuous voltage.

In accordance to the invention, the second vertical deviation plate 9' is connected to a generator 21 furnishing three successive appropriate values of voltage at very high frequency, corresponding to each monochromatic dot of the picture. A control grid 18 is provided on the electron gun of camera 8, and cuts out periodically the beam by means of appropriate signals from generator 20 synchronized with generator 21 on a frequency obtained through a multiplier 19 controlled by means end of line signals in generator 14.

Generator 20 cuts off the signal to the grid during the vertical descents of the voltage shown in Figure 1. Generator 20 energizes the grid to permit electron flow during horizontal plateaus 102, 104, and 106 and deenergizes the grid to stop electron flow during voltage changes 103, 105 and 107. The generator 20 is caused to go on and off to produce these effects at proper times since it is fed by synchronizing signals from multiplier 19.

This last multiplier 19 controls a third multiplier 33 generating the carrier wave of television emission in synchronism with the deflecting system. This accurate time relationshisp between the modulator at the sending station and the demodulator at the receiving station gives according to one embodiment of the invention greater facilities to separate the three channels and to synchronize the control of the color, and also to reduce the band width as above described.

The photoelectric currents received from screen 10 are amplified in amplifier 23. An accurate commutator system 30 is provided for cyclic selection of the instantaneous current corresponding to each of the three color channels. In the alternative electronic tube commutation may be used for that purpose. In order to understand well the principle of operation the drawing describes this separator as a brush rotating on three sectors Y, R, B driven by synchronous motor 31 at the same frequency as the deviation device 21 and cut-off device 20.

The yellow channel is fed directly to transmitter 24, its bandwidth being between $\phi$ and 2 megacycles. For the red and blue channels the band frequencies are transposed into two consecutive side bands by means of heterodynes 28 located for example 2 megacycles for the red and heterodyne 29 for example 3 megacycles for the blue. The modulation of the red channel through heterodyne 29 gives a side band only from 2 to 4 megacycles, by means of filtering device 29A.

The modulation of the blue channel through heterodyne 28 and filter 28A gives a side band from 4 to 6 megacycles.

With means of filtering devices, these three distinct channels are added with the "end of line" signal 14 and "end of field" signals 11. And they are used to modulate finally the carrier wave generated in oscillator 33. The combined intelligence is directed to sending station 24 for radio emission on antenna 25.

Figure 9:
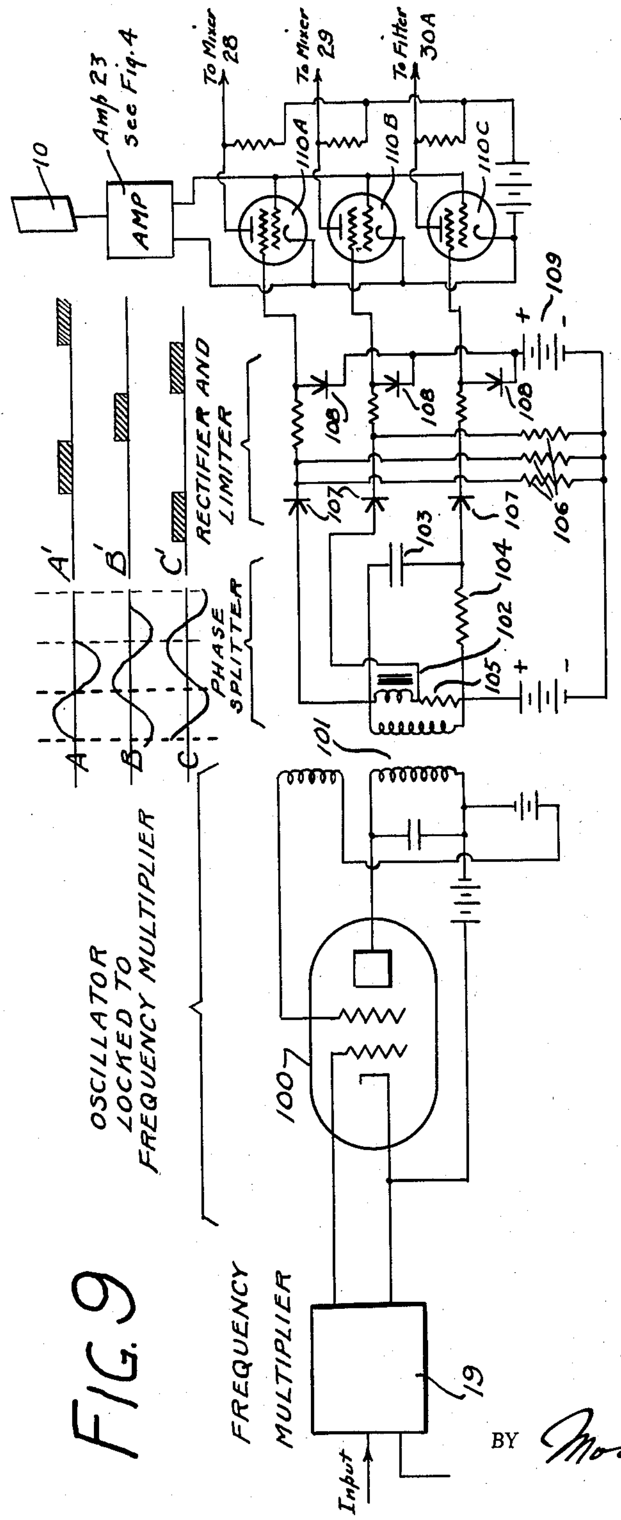
Figure 9 is a modified form of receiving station.

The rotating switch arm of switch 30 is caused to rotate at such speed that it moves from one contact to the next each time a new impulse is produced by the color wheel 4. That is, the switching channel is shifted one contact every time an impulse might be expected from amplifier 23. This involves high speed switching and it is more practical to use electronic switching as shown in Figure 9. That figure shows the frequency multiplier 19 feeding oscillator 100. The latter feeds transformer 101 the output of which feeds phase splitter 102, 103, 104, and 105 which produces the three phase output A, B, C shown in the drawing. The three phase output then passes through a rectifier 107 whereby half-wave three phase voltages appear across resistors 106. Rectifiers 108 operate against the bias of battery 109 and constitute limiters to cut off all potential above the voltage of battery 109. Hence, the output of the limiter is shown as waveforms A', B', C', at the top of the figure. The three tubes 110A, 110B, 110C are inoperative except when receiving positive impulses A', B', or C'. Therefore, the outputs of the three tubes 110A, 110B, and 110C appear in succession and these outputs are controlled by amplifier 23 as shown in Figure 9. The switching of Figure 9 is synchronized with the position of the beam since both are controlled by multiplier 19. My prior Patent 2,471,253 and my prior copending application S.N. 739,018, filed February 4, 1943, help one to understand Figure 9 herein.

Figure 5:
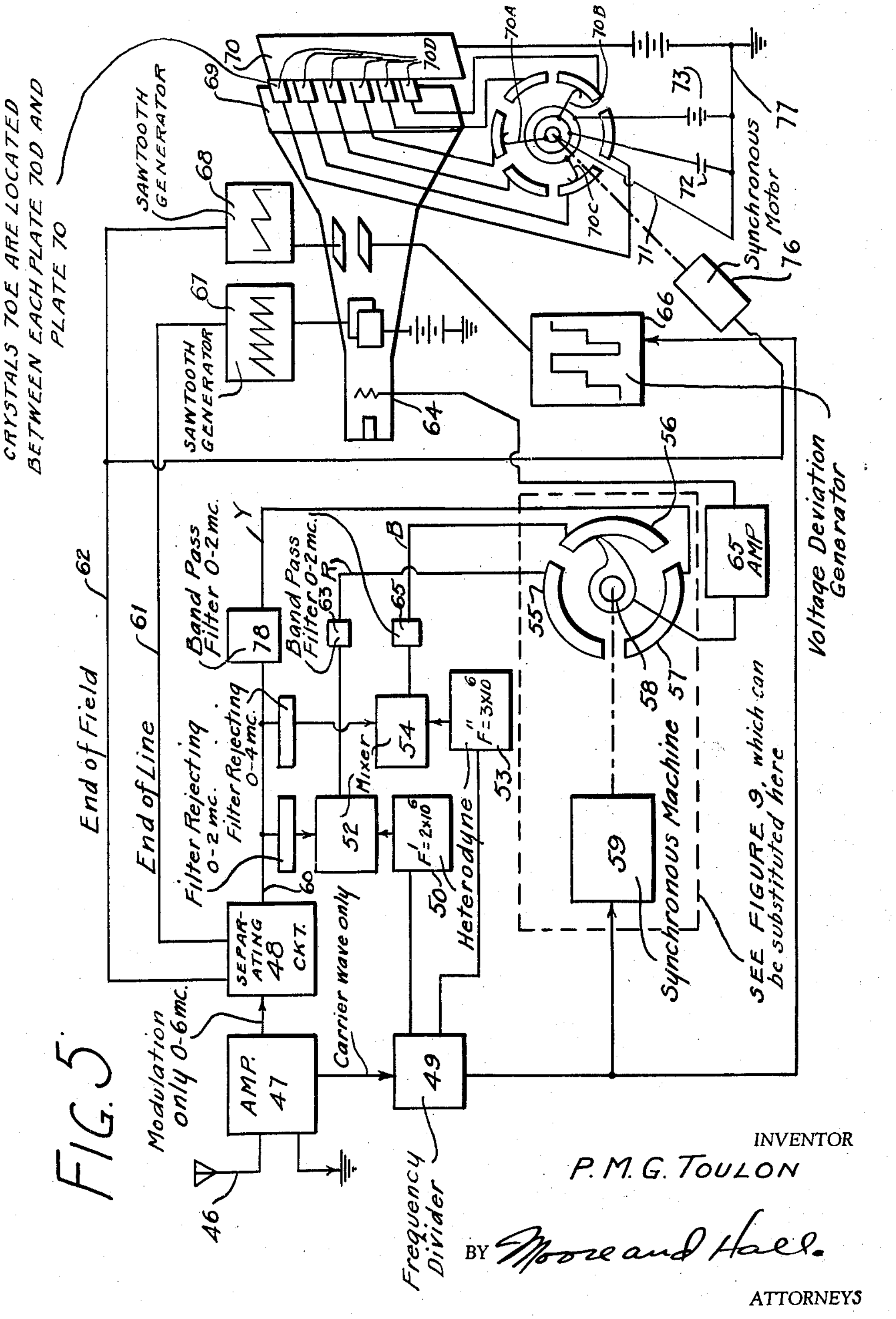
Figure 5 shows the circuit of the receiving color station.

Figure 5 shows the corresponding color receiving station. The radio waves 46 are amplified in 47. A preferred embodiment of the invention has means for tying up with great accuracy the modulation heterodyne of the receiver with that of the transmitter. To that effect the carrier frequency is applied to a frequency divider 49.

The modulation is detected and applied to a classic separator 48 for feeding the "video" channel 60, the "end of line" channel 61 and the "end of field channel" 62.

As classically, the channel 61 synchronizes the high frequency sawtooth relaxator 67 for feeding the cross picture deviation plates of tube 69. Channel 62 synchronizes the low frequency sawtooth relaxator 63 for feeding the vertical field deviation plate of the tube.

According to the invention, I use the frequency divider 49 to synchronize two heterodynes 50 and 53.

The video channel 60 is filtered in 78 below 2 megacycles and therefore the channel is separated and supplies a first sector 57.

The middle band 2 to 4 megacycles corresponding to the red color is isolated and transferred in 52 to the band from 0 to 2 megacycles by means of heterodyne 50. The result is applied to sector 55.

The external band 4 to 6 megacycles corresponding to the color is isolated and transferred in 54 on the band from 0 to 2 megacycle through heterodyne 53. The result is applied to sector 56.

The three elementary monochromatic pictures are synchronized with the changes 58 of the color channel and appear practically simultaneously on three different parts of the screen by the means of an accurate additional voltage deviation generator 66 also synchronized on multiplier 49. For example, the yellow picture appears on line 1, the red pictures appear on the $525/3=175$th line, the blue picture appears on the $$1+\frac{2\times 525}{3}=350+1=351$$

and during the scanning all three colored lines are continuously displacing from top of the field down to the bottom.

In accordance with the scanning frequency the color filter before the screen is modified. According to an embodiment of the invention electrostatic optical means are provided in the form of birefringent materials 70E such as ammonium phosphate crystals.

Three brushes 70A, 70B, and 70C are fed with three different potentials respectively. Brushes 70B and 70C have different potentials than from brush 70A and from each other due to batteries 72 and 73. The synchronous motor 76 rotates the brushes so that three different voltages appear in succession on each of the plates 70D. This causes the plates 70D to have potentials that rise and fall in sequence. Any one plate 70D goes through a cycle of three potential changes for each rotation of motor 76. Hence the ammonium phosphate crystals that are between each plate 70D and plate 70 change their filtering characteristics. Plates 70D and plate 70 constitute polarizing plates. The result is that the crystals adjoining any one plate 70D change the white light passing through it to yellow, red, and blue for each rotation of motor 76, and moreover the color of the top band moves down the screen at a uniform speed. The crystals, when subjected to the electrostatic field created by the adjoining plates, do not produce light. They merely filter it and allow only one color to pass, the color depending on the potential. This is explained in my prior copending application S.N. 162,327, filed May 16, 1950, entitled Electro-Optical Screens for Color Television.

It is also understood that I may replace the plates 69, 70, and 70D with the usual rotating disc such as I have shown in Figure 1. In this event I operate the rotating disc at the receiver at the same speed as the one at the transmitter, the synchronization being carried out in any well known way.

The voltage applied to these bands is modified in course of time. According to an alternate means of the invention electrostatic distribution means are used for this voltage changes, but for the intelligence of the drawing, a group of 3 brushes rotating on circular sectors had been described.

The three brushes are supplied with appropriate voltages so as to impose the proper colorings to the electro-optical elements. The brushes are disposed at 120° one from the other and are driven through a small motor 76 synchronized on the end of field signals 62.

Figure 6:
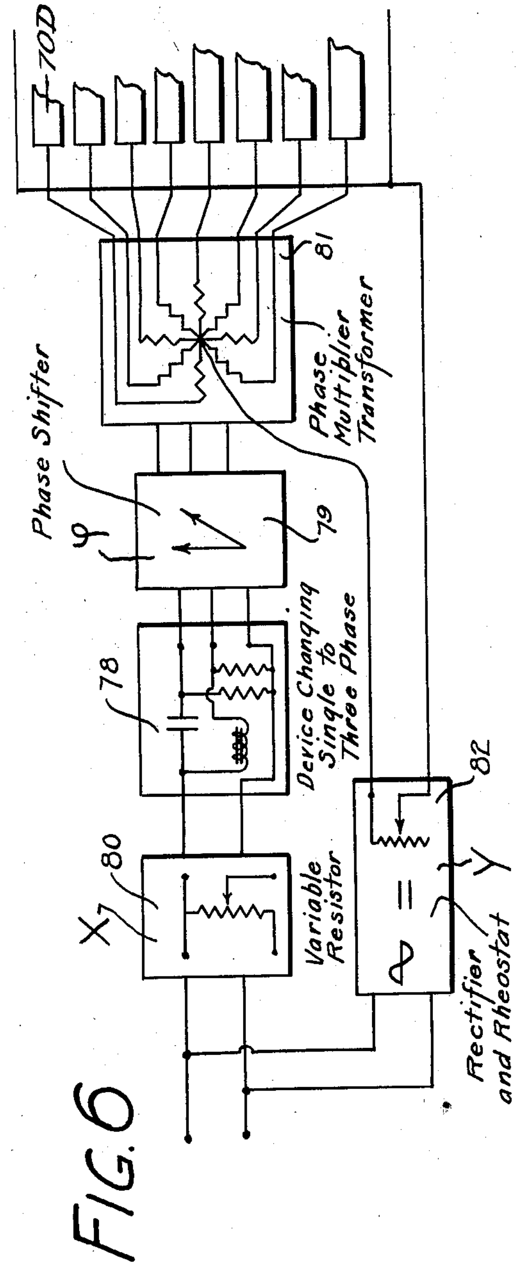
Figure 6 is a process for moving the color of the filter over the field by electrical means.
Figure 8:
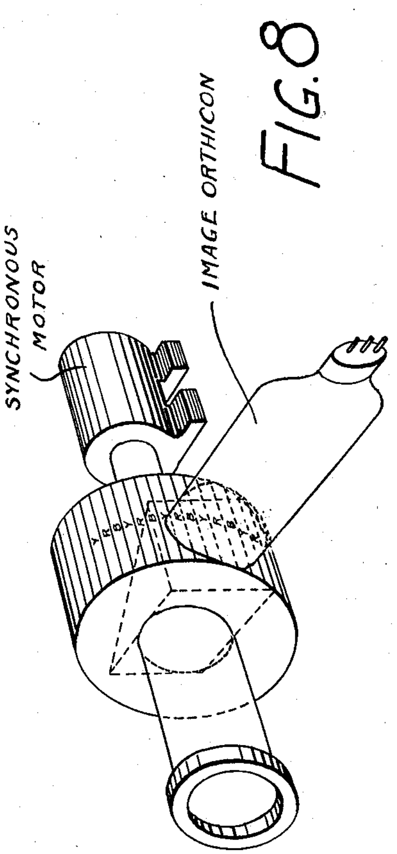
Figure 8 shows the camera at the transmitting studio, said camera including a revolving drum scanning three colors simultaneously within the height of the picture.

Figure 6 shows a motionless electrical means to obtain the same result. According to this embodiment of the invention the conductive transparent bands are supplied with voltages from the successive phases of a phase multiplier transformer 81. The amplitude of the sinusoidal voltages and average value of its biasing polarization and the chosen phase $\phi$ are determined so as to generate the three required voltage values in time, location and amplitude.

If A, B, C are the three values of required voltages, corresponding to the three monochromes, the amplitude of the alternative tension X, the bias Y and the phase $\phi$ correspond to the three equations:

$$A=Y+X\ \sin\ (0°+\phi)$$
$$B=Y+X\ \sin\ (120°+\phi)$$
$$C=Y+X\ \sin\ (240°+\phi)$$

The solutions to the three equations determine X, Y, and $\phi$ and therefore a correct determination of the three variables brings the solution to the three equations as well as it locates correctly the displacement of the color bands down the screen.

A low frequency generator is synchronized as explained in 76 and imparts at the proper time the required color to the different ribbons of the screen.

Figure 6 shows a circuit for obtaining such a result. The classical single phase current supply at 60 cycle A.C. is transformed into a triphase distribution 78.

Phase $\phi$ is adjustably shifted in 79 and the voltage amplitude X is changed in 80. The continuous rectified Y tension is adjusted in 82. The number of phases each for supplying each of the ribbons is multiplied through star winding secondary transformers 81.

Figure 7:
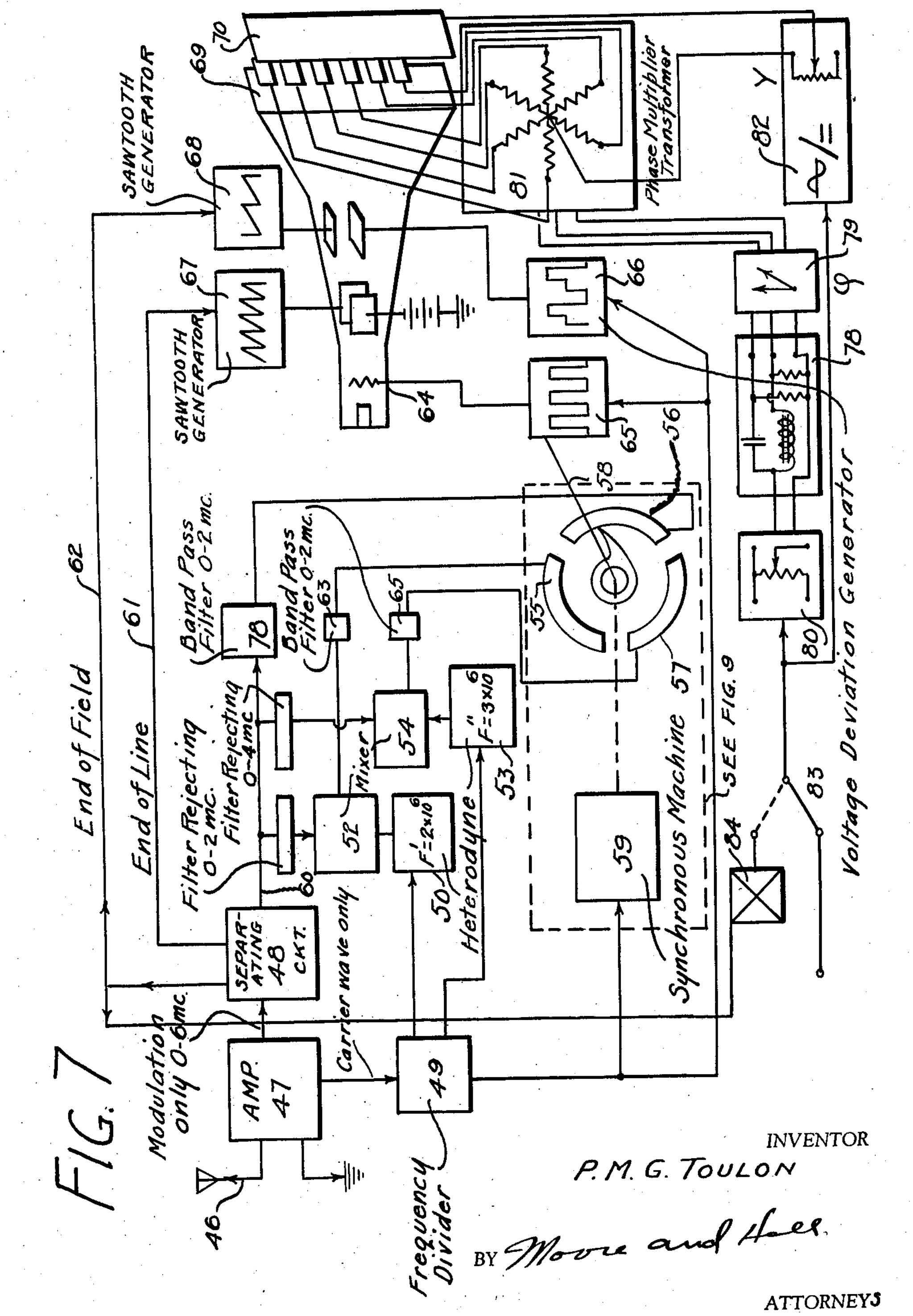
Figure 7 shows a complete circuit with electro-optical filters.

Figure 7 is a combination of lines 5 and 6 the same reference numbers applied to the same devices.

Usually because of the directional effect of ultra short waves used in television, the sending station is locally received; therefore the phase shift between the current 60 cycle A.C. supply at transmitter and the receiver is usually very small.

Under the aforesaid conditions, the synchronization is sufficiently good by directly using the supply frequency of 60 cycle A.C.

In other cases when there are no interconnections through the current supply system the end of the field signals are used to synchronize a locally operated frequency generator 84 which in fact is actuated as a result of the signals received from the transmitter.

Figure 10:
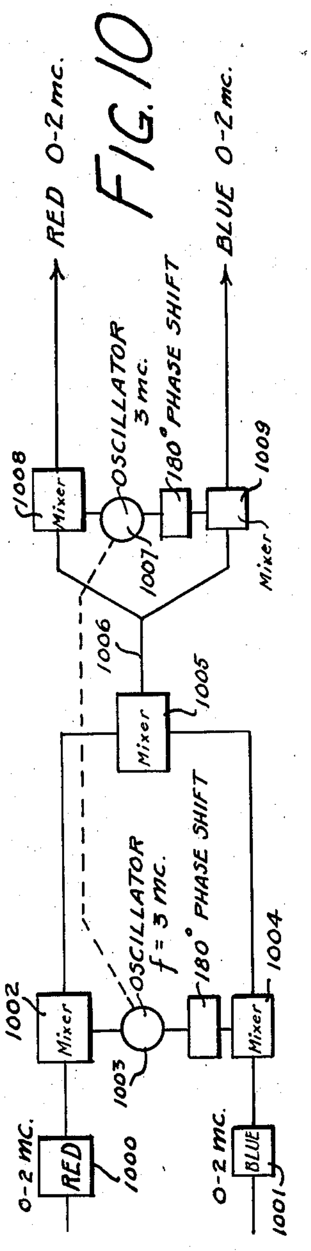
Figure 10 is a circuit of certain alternate details of the invention.

In order to send two colors over the same channel 1006 of 2 to 4 megacycles I may employ the circuit of Figure 10. Assume that circuit 1000 has the "red" video impulses in an 0–2 mc. channel and that circuit 1001 has the "blue" impulses in an 0–2 mc. channel. Mixer 1002 mixes the output of circuit 1000 with the 3 mc. output of oscillator 1003. Mixer 1004 mixes the output of circuit 1001 with the output of oscillator 1003 but after a 180-degree phase shift. The outputs of mixers 1002 and 1004 are mixed at 1005 and sent over line 1006 to the receiver. At the receiver the oscillator 1007 which oscillates exactly in phase with oscillator 1003 acts on the mixers 1008 and 1009. The latter is fed with currents phase shifted by 180 degrees. Hence mixers 1002 and 1004 are fed 180 degrees apart by oscillator 1003, the same as mixers 1008 and 1009. Consequently the output signals of Figure 10 are truly separated. By making suitable obvious changes in Figure 4, the features of Figure 10 may be included therein.

The result specified in connection with Figure 10 can also be obtained if the phase shifters shift the phase by 90 degrees instead of 180 degrees.

I claim to have invented:

1. In a television system, scanning means for scanning a horizontal line, a vertical sweep generator for controlling the position of the horizontal line scanned to tend to alter the vertical position of the scanning line a small increment after each line scanned, and a second sweep generator in series with the vertical sweep generator for changing the vertical sweep voltage a large amount during each of a small number of distinct steps and then returning the voltage of the second sweep generator to its original value, the frequency of the second sweep generator being large as compared to that of the first named sweep generator.

2. A television system as defined in claim 1 in which the voltage changes of the two sweep generators are in the same direction.

3. A television system according to claim 2 including color filtering means for effecting different colors to the picture element scanned following each of said distinct steps of voltage change, and means for causing the colors transmitted by the color filter to move vertically across the picture at the same rate that the vertical sweep generator taken alone tends to move the scanning line.

4. A television system according to claim 3 in which the color filter comprises stationary means for imparting different colors to the light beams pasing through different portions thereof and means for causing the said different portions to progressively change color.

5. A color television receiver comprising a picture tube having horizontal and vertical sweep deflecting means, means for applying a deflecting potential varying at line-frequency rate to the horizontal deflecting means, means for applying a deflecting potential to the vertical deflecting means which repetitively shifts the beam successively between three widely spaced lines at a rate which is very high as compared to the line frequency rate and which after said widely spaced lines have been scanned shifts the beam to similarly scan a similar group of similar lines which respectively follow the lines of the first group as the whole frame is progressively scanned, the last-named means including means whereby the potential is continuously applied during at least some of said shifts from one line to another, and means for imparting color to the light produced by the cathode ray tube to give light from each of said three lines a different primary color and to sequentially change the primary color applicable to any given line each time the line is scanned.

References Cited in the file of this patent

UNITED STATES PATENTS

| | | |
|---|---|---|
| 2,479,880 | Toulon | Aug. 23, 1949 |
| 2,744,949 | Toulon | May 8, 1956 |

FOREIGN PATENTS

| | | |
|---|---|---|
| 1,041,809 | France | Oct. 27, 1953 |

OTHER REFERENCES

Principles of Television Engineering by Donald Fink, 1st. ed., copyright 1940, page 131.